Aug. 29, 1950 G. CHAUSSON 2,520,528
DAMPED SPRING DEVICE FOR USE WITH VEHICLES
Filed Nov. 30, 1945 2 Sheets-Sheet 1
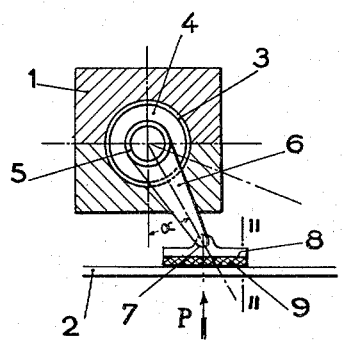
FIG.1
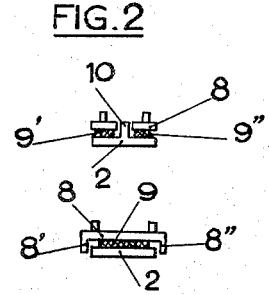
FIG.2
FIG.3
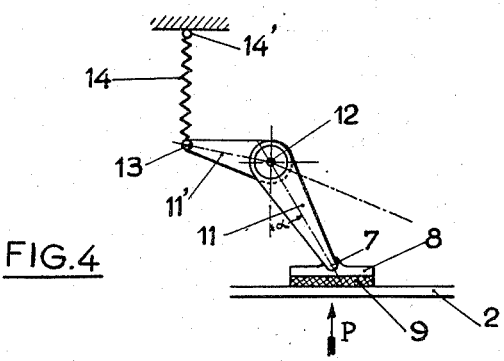
FIG.4
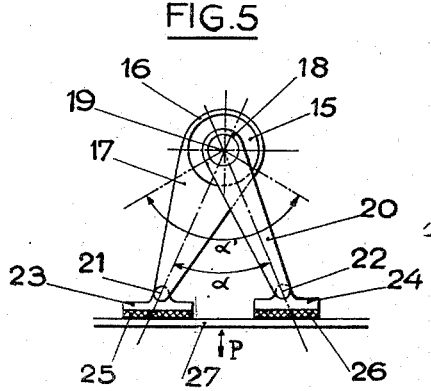
FIG.5
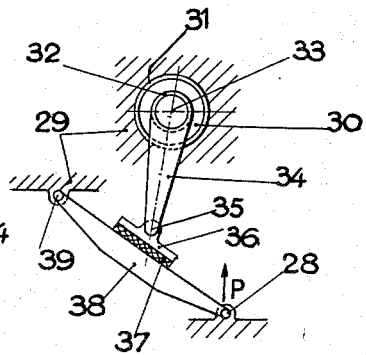
FIG.6
Inventor
Gaston Chausson
by [signature]
Atty

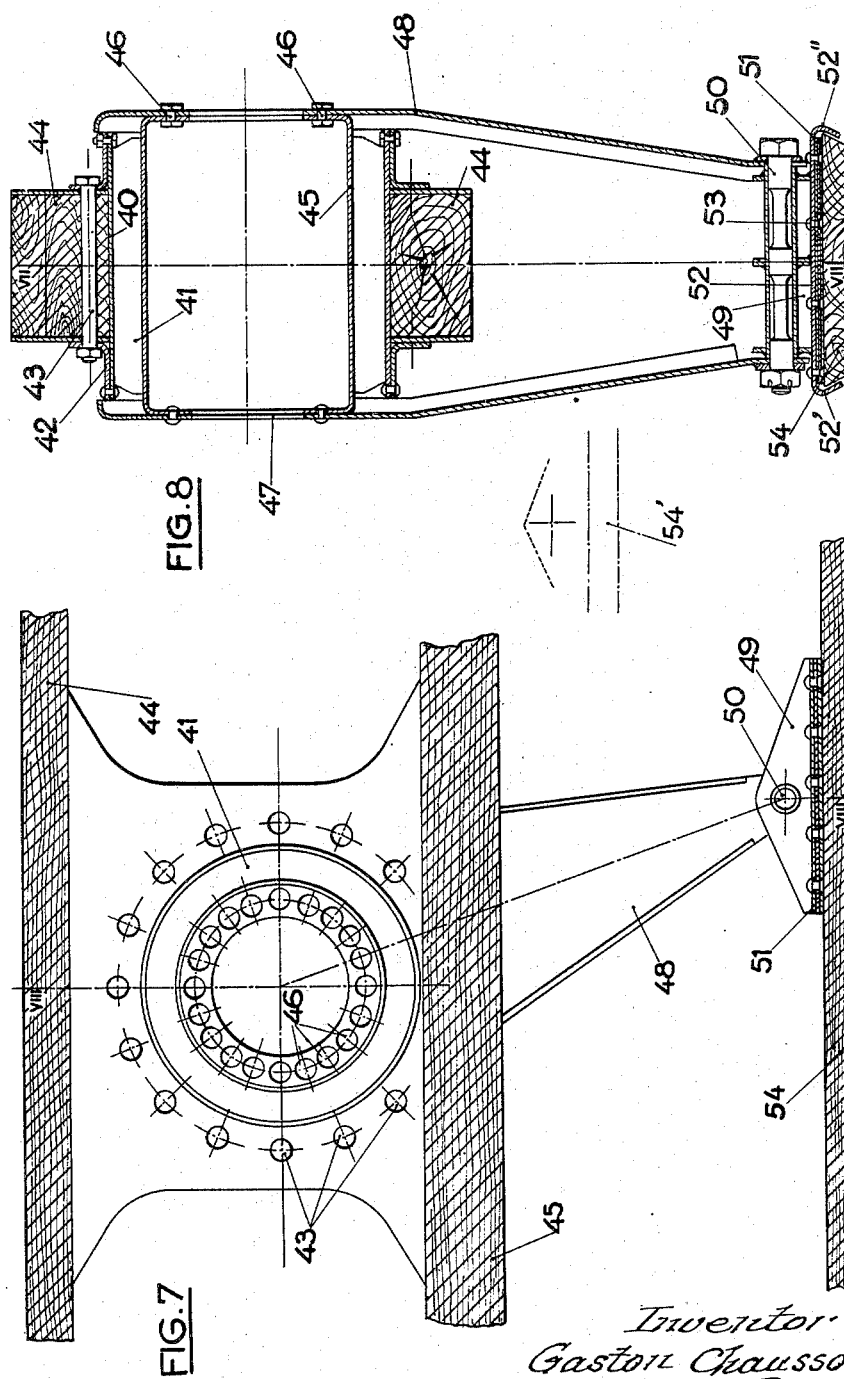

Patented Aug. 29, 1950

2,520,528

UNITED STATES PATENT OFFICE 2,520,528

DAMPED SPRING DEVICE FOR USE WITH VEHICLES

Gaston Chausson, Asnieres, France, assignor to Societe Anonyme Des Usines Chausson, Asnieres, France, a company of France Application November 30, 1945, Serial No. 631,891
In France May 24, 1944

Section 1, Public Law 690, August 8, 1946
Patent expires May 24, 1964

4 Claims. (Cl. 267—9)

This invention relates to damping devices and more particularly to such devices for use with vehicles, especially for aircraft under-carriages for absorbing, on landing, the kinetic energy then corresponding to the vertical speed of the aircraft.

It is the principal object of the invention to provide a damper that has a reaction, that is as constant as possible all along its travel and that shall restore only a portion of the energy it has absorbed, in such a manner as to reduce any tendency to bounce.

A damper, in accordance with the invention, comprises an elastic member producing a reaction torque substantially proportional to the angle of deviation and which is placed in tension through an inclined lever in such a manner that the moment, about the axis of rotation of the elastic member, of the stress, exercised at the end of the lever, increases with the angle of distortion of the elastic member.

According to another characteristic, a friction device having the effect, on the one hand, of modifying the angle of utilization of the lever and, on the other hand, of introducing frictional resistance, permitting the dissipation of energy, is interposed between said lever and the part receiving the forces to be damped. A suitable selection of the setting of the lever and of the coefficient of friction of the friction member provides a particularly advantageous load-travel diagram.

According to one form of embodiment, a lever articulated to the body of the aircraft is engaged with a damping member constituted by an elastic torsion, traction or compression unit mounted on said body. The lever engages, by means of a brake shoe at its free end, a brake surface on a landing skid or on an articulated link lever supporting a wheel or skid, said lever being normally inclined relatively to said landing skid or wheel supporting link lever.

According to a modification, rings concentrically engaging the torsion unit are respectively fixed to two levers which are inclined in opposite directions, each bearing by a brake shoe on the landing skid or link lever and diverging scissor-fashion under the vertical force produced on landing.

In another form of embodiment, the inclined lever is constituted by a bell-crank lever mounted on an axis supported in the body of the aircraft, the end of the arm inclined relatively to the landing side of said lever bearing the brake shoe, and the end of its other arm being connected to a traction or compression member ensuring damping.

Further features and advantages of the invention will be gathered from the following specification and from the drawings in which the invention is illustrated by way of example.

Fig. 1 is a diagrammatic side view in elevation of a basic construction in accordance with the present invention;

Fig. 2 is a view in cross-section taken on line II—II of Fig. 1;

Fig. 3 is a view in cross-section, similar to Fig. 2, showing a modification;

Figs. 4, 5 and 6 are views similar to Fig. 1 and respectively illustrating modifications of the invention;

Fig. 7 is a cross-sectional view taken transversely of the axis of the basic form of the invention and corresponding to line VII—VII of Fig. 8; and Fig. 8 is a view in cross-section taken on line VIII—VIII of Fig. 7.

Referring now to the drawings, specifically to Fig. 1, a damper according to the present invention is interposed between the body 1 of the aircraft and a landing skid 2, and comprises a torsion unit composed of a ring 3, fixed to the body 1, in which is secured a rubber annulus 4 and a ring 5 fixed internally of the rubber annulus. The lever 6 is fixed to the internal ring 5 and is inclined rearwards. Said lever is pivotally articulated at 7 to a brake shoe 8 resting, by a friction lining 9, on the landing skid 2.

In order to prevent the brake shoe 8 from sliding laterally on the landing skid 2, means for guiding the latter in the longitudinal direction have been provided. For instance, as shown in Fig. 2, the landing skid 2 may comprise a central upstanding flange 10 and the friction lining 9 may be divided into two parts 9', 9" positioned on opposite sides of the flange 10. Alternatively, as shown in Fig. 3, the brake shoe 8 may comprise an inverted channel, the flanges 8', 8" of which span the landing skid 2.

When a vertical force P is applied to the skid 2, upon landing, the latter tends to move toward the body 1 of the aircraft; it thus exerts a pressure on the brake shoe 8 which transmits said pressure, through its pivot 7, to the lever 6. The latter therefore rotates, by reason of its obliquity, anti-clockwise, communicating a torsional force to the rubber annulus 4 which damps said force. Moreover, the friction produced by the lining 9 on the top of the landing skid 2 likewise brakes said movement, thus also cooperating in the damping. There is therefore produced simultaneously an increase in angle and a sliding movement of the brake shoe 8 relatively to the landing skid 2.

According to a modification, as shown in Fig. 4, the brake shoe 8 bearing by the lining 9 on the landing skid 2 is articulated at 7 to a bell-crank lever 11 mounted on a pin 12 supported by the body of the aircraft. The end 13 of arm 11' of a bell-crank lever is connected to an elastic member, such as the coiled spring 14, the end 14' of which is secured at a fixed point of the body of the aircraft. In this case, the spring member 14 constitutes the elastic unit of the damper and the bell-crank lever is arranged in such a manner that the force exercised by said spring may remain substantially constant during the movement of said bell-crank lever.

Moreover, the functioning is similar to that of the preceding example. Under the force P, the lower arm of the bell-crank lever 11 rotates counter-clockwise, increasing its angle of obliquity a. The friction of the lining 9 on the skid 2 exerts a braking which likewise participates in the damping of the force which is counteracted for the major part by elastic member 14.

In the modification of Fig. 5, a torsion member constituted by a rubber annulus 15 is fixed to an outer ring 16 which is itself fixed to a lever 17. The rubber annulus 15 is also fixed to an inner ring 18 mounted on a pin 19 supported by the body of the aircraft. Obviously, the parts may be in reversed relation with the ring 18 mounted in a bearing fixed to the aircraft body. The levers 17 and 20 are oppositely inclined and bear, by means of pivots 21 and 22, upon brake shoes 23, 24, fitted with friction linings 25, 26, respectively, applied on the landing skid 27. In this case, when at the time of the landing the skid 27 sustains a vertical force P directed towards the body of the aircraft supporting the pin 19, the two levers 17 and 20 increasingly diverge, the angle a assuming for instance the value a'.

The damper thus constituted therefore functions scissor-fashion. This arrangement has the advantage of not transmitting a torsion torque to the member supporting the damper. Thus, the body of the aircraft only receives the vertical force suitably damped by the damper.

Fig. 6 shows another modification that is particularly adaptable for a wheel or skid 28 or a similar unit. The outer ring 31 of the damper, which is fixed to a rubber annulus 30, forming a torsion member, is fixed to the body 29 of the aircraft. The inner ring 32, fixed to the rubber annulus 30, is provided with a lever 34 which is connected by a pivot 35 to a brake shoe 36 having a friction lining 37. Said lining bears on a lever 38 which is pivoted at one end to a fixed point 39 of the body and at the other end to the wheel or skid 28.

When a vertical force P is exerted on said wheel or skid on landing, the lever 38 pivots counter-clockwise and tends to cause the lever 34 to swing in the same direction, the torsion unit 30 and the friction between the lining 37 and the lever 38 both opposing such movement. The damping action is therefore the same as in the example in Fig. 1.

Figs. 7 and 8 show a practical embodiment of the damper as applied to a glider. The outer ring 40, fixed to the rubber annulus 41, is fixed by means of bushings 42 and bolts 43, to the girder 44 forming part of the body of the glider. The inner ring 45 is secured, by bolts 46, to the webs 47, 48 of the lever, to the lower end of which the brake shoe 49 is pivotally connected by a pin 50. The friction lining 51, fixed to the sheet metal plate 52 of the brake shoe by means of rivets 53, bears on the landing skid 54. The sheet metal plate 52 is bent over at its edges to form guide flanges 52', 52" to guide the brake shoe along the landing skid 54 and to maintain the latter in the vertical direction. When the vertical force is transmitted, at the moment of landing, to the skid 54, the latter is forced up to the position 54' diagrammatically indicated in broken lines, against the torsional resistance of the rubber annulus 41. Thus, the functioning is the same as that described with respect to Fig. 1.

The invention, obviously, is not limited to the specific embodiments shown, for many modifications may be embodied without exceeding its scope. In particular, the rubber annulus may be replaced by any other torsion member, such as a spring, a bar or an assembly of bars. Likewise, the elastic unit 14, in Fig. 4, may be replaced by another member, mechanical or otherwise, or even by a compression member attached to the arm 11' in opposite relation to that of member 14, that is to say from top to bottom. Said members might, for instance, be an elastic, a compressible means, a pneumatic or hydraulic unit.

What I claim and desire to secure by Letters Patent of the United States is:

1. A damped spring device including a member mounted for linear movement relative to a fixed member, a pair of levers mounted for pivotal movement about a common axis on said fixed member, a foot member on each of said levers, in frictional sliding engagement with said movable member, and means for resiliently resisting pivotal movement of said levers under shock forcing said movable member toward the fixed member.

2. A damped spring device including first and second relatively spaced parts movable toward and from each other, lever means pivotally mounted on the first part and extending toward the second part, a flat elongated brake surface carried by said second part substantially transversely of the line of movement between said parts, a flat brake shoe pivotally mounted on the free end of said lever means and frictionally engaging said brake surface for movement therealong, and means resiliently supporting said lever means at a selected angle relative to said second part to position said brake shoe against said brake surface and to resist pivotal movement of said lever means relative to said first part that is incident to the movement of said parts toward each other, whereby the frictional resistance between said brake surface and shoe and the resilient resistance against pivoting of said lever means combine to resist relative movement of said two parts toward each other.

3. A damped spring device including first and second relatively spaced parts movable toward and from each other, lever means pivotally mounted on the first part and extending toward the second part, a flat elongated brake surface carried by said second part substantially transversely of the line of movement between said parts, a flat brake shoe pivotally mounted on the free end of said lever means and frictionally engaging said brake surface for movement therealong, and means resiliently biasing said lever means toward said second part to press said brake shoe against said brake surface and to resist pivotal movement of said lever means toward said first part, whereby the frictional resistance between said brake surface and shoe and the resilient resistance against said lever means combine to resist relative movement of said two parts toward each other.

4. A damped spring device including first and second relatively spaced parts movable toward and away from each other, lever means pivotally mounted on the first part and extending at an angle toward the second part, a link respectively pivoted at its ends to said first and second parts, a flat elongated brake surface on said link substantially transversely of the of the line of movement between said parts, a flat brake shoe pivotally mounted on the free end of said lever means and frictionally engaging said brake surface for movement therealong, and means resiliently acting on said lever means to retain said brake shoe against said brake surface and to resist the pivotal movement of said lever means relative to said first part that is incident to the movement of said parts toward each other, whereby the frictional resistance between said brake surface and shoe and the resilient resistance against pivoting of said lever means combine to resist relative movement of said two parts toward each other.

GASTON CHAUSSON.

REFERENCES CITED

The following references are of record in the file of this patent:

UNITED STATES PATENTS

| Number | Name | Date |
|---|---|---|
| 1,002,416 | Martin | Sept. 5, 1911 |
| 1,203,041 | Pardee | Oct. 31, 1916 |
| 1,312,284 | Stanton | Aug. 5, 1919 |
| 1,761,965 | Blackmore | June 3, 1930 |
| 1,892,064 | Markey | Dec. 27, 1932 |
| 2,090,223 | Ney | Aug. 17, 1937 |

FOREIGN PATENTS

| Number | Country | Date |
|---|---|---|
| 166,962 | Great Britain | July 25, 1921 |
| 793,615 | France | Feb. 10, 1936 |
| 485,077 | Great Britain | May 13, 1938 |